(12) United States Patent
Westphal

(10) Patent No.: US 6,567,727 B2
(45) Date of Patent: May 20, 2003

(54) FLIGHT CONTROL SYSTEM

(75) Inventor: Peter Westphal, Munich (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/954,215

(22) Filed: Sep. 18, 2001

(65) Prior Publication Data

US 2002/0055809 A1 May 9, 2002

(30) Foreign Application Priority Data

Sep. 18, 2000 (DE) .......................... 100 46 007

(51) Int. Cl.$^7$ ................................ B64C 1/00
(52) U.S. Cl. .................. 701/4; 701/3; 701/5; 701/6; 701/120
(58) Field of Search ................ 701/3, 4, 5, 6, 701/7, 8, 9, 10, 14, 17, 120, 77, 98

(56) References Cited

U.S. PATENT DOCUMENTS

| | | | | | |
|---|---|---|---|---|---|
| 6,043,757 | A | * | 3/2000 | Patrick | 340/963 |
| 6,259,976 | B1 | * | 7/2001 | Lemelson et al. | 701/3 |
| 6,278,913 | B1 | * | 8/2001 | Jiang | 701/3 |
| 6,294,985 | B1 | * | 9/2001 | Simon | 340/435 |

* cited by examiner

Primary Examiner—William A. Cuchlinski, Jr.
Assistant Examiner—Marthe Y. Marc-Coleman
(74) Attorney, Agent, or Firm—Crowell & Moring LLP

(57) ABSTRACT

A flight control system automatically recognizes safety-critical flight conditions and transmits timely guidance to the pilot for correcting such flight conditions. The flight control system includes a computer which runs parallel to the flight control computer, and uses fuzzy logic to carry out risk evaluations with respect to actual flight conditions using knowledge bases implemented in the flight control system. The results of these risk evaluations are displayed in the cockpit.

10 Claims, 3 Drawing Sheets

FLIGHT CONTROL SYSTEM

BACKGROUND AND SUMMARY OF THE INVENTION

This application claims the priority of German patent document 100 46 007.0, filed Sep. 18, 2000, the disclosure of which is expressly incorporated by reference herein.

The invention relates to a computer implemented flight control system for an aircraft.

Airplanes with modern flight control systems are part of the technical pioneering achievements of our time. Few technologies incorporate such complexity and such a degree of perfection when converting engineers' knowledge into the implementation of new systems. However, despite all the sophisticated systems, there are still airplane crashes. After an overall analysis of the flight, the causes an accident are determined, and consequences are established from the crashes in order to eliminate these causes by changed methods and system changes for future flights.

Although these results have made flight traffic safer, there will still be new accidents resulting from new causes as well as from known causes that have not been eliminated. The consequences of the causes are partially known but can occur again because conventional techniques do not allow a proper reaction to the combination of accident causes. This means that the circumstances of the accident may be repeated because the lessons learned from accidents was not sufficiently implemented in the airplanes.

On the other hand, new accidents also occur because of new unpredicted cause combinations. These are combinations which can only be roughly estimated by experts because of an only approximate idea of the system performance.

Furthermore, the system performance may not have been sufficiently included in the analyses, because an occurrence had not been considered possible until the flight accident occurred, in that the cross connections between a system malfunction and human operating behavior had not been analyzed. This system performance had at least not been implemented in a protection or warning system, and in the best of all circumstances reports may exist concerning the effects of the malfunction.

In known computer-based flight control systems, the consequences are evaluated from combinations of obtained flight and system parameters, by implementing existing safety analyses. The latter, however, are not actively integrated in the algorithm of the flight control systems.

Using these flight control systems, the pilot is often unaware of the danger of a flight situation at the critical moment. And even if he is warned, it is not certain that he will recognize the danger in time to perform an accident-avoidance maneuver which is adapted to the situation.

If the pilot is warned at the decisive moment, he will obtain a flood of (important and unimportant) information from which he must draw the correct conclusions, in a high stress situation, under extreme time pressure, sometimes with fatal consequences.

It is an object of the invention to provide a cockpit flight control system which automatically detects safety-critical flight conditions, and supplies advice to the pilot in time for correcting these flight conditions.

This and other objects and advantages are achieved by the flight control system according to the invention, in which an additional computer is provided in the airplane, operating parallel to the flight control. As a vigilant observer, it monitors flight and system parameters. In contrast to the crash recorder, an analysis of the detected data is not deferred to experts on the ground, weeks after a flight accident; rather, the computer automatically and continuously carries out risk estimates during the flight and emits recommendations for actions by the pilot.

As a result of the solution according to the invention, the total expert knowledge is available to the pilot in real time and can therefore provide a basis for decisions about the most important accident-preventing measures. In this case, the system must be capable of implementing the expert knowledge; specifically, precisely in the form in which expert knowledge is available to judge such events.

Advantageously, the flight control system according to the invention uses a fuzzy logic system, based on linguistic rules. Fuzzy systems are very tolerant with respect to faults and range definitions, and are therefore better suitable than stringent threshold values for obtaining a good overview of potential good and bad system conditions. Stringent threshold values will fail at the smallest undefined departure from their definition ranges.

In particular, the most varied flight and system parameters can be linked with the fuzzy logic. Likewise, the problems existing in the known flight control systems concerning warning threshold values are softened, without, however, losing the requisite precision. The latter advantage is achieved according to the invention by a dual assignment of the rules in a conventional manner as well as in the fuzzy logic.

The flight control system according to the invention has an open structure by means of which new knowledge concerning flight accidents or new system trends can be implemented at low expenditures, and in a clear format.

Other objects, advantages and novel features of the present invention will become apparent from the following detailed description of the invention when considered in conjunction with the accompanying drawings.

DETAILED DESCRIPTION OF THE DRAWINGS

Figure 1:
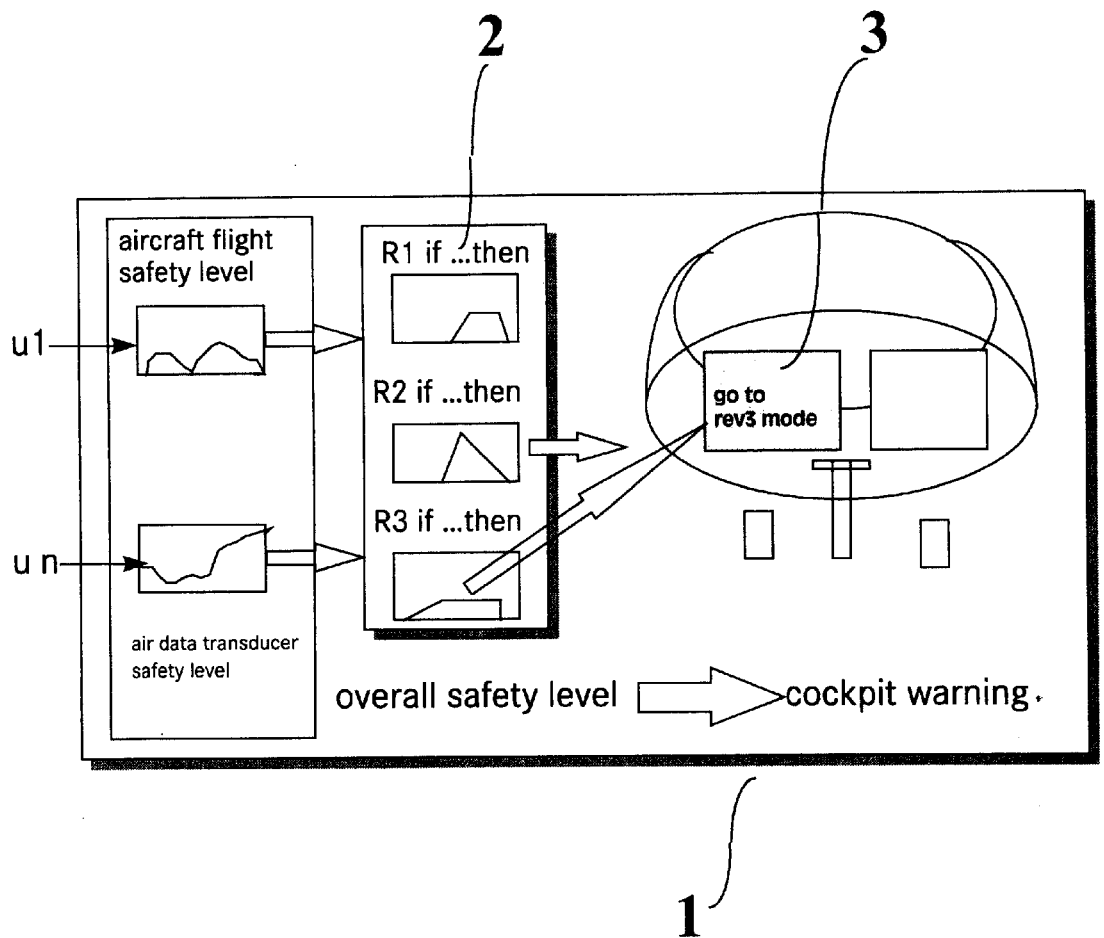
FIG. 1 is a view of the principle of the flight control system according to the invention.

The flight control system illustrated in FIG. 1 is constructed as a cockpit warning system which, by analyzing input data $u_1$ to $u_n$, and using fuzzy logic 2, detects potential risk combinations. It also assigns priorities to the detected risk combinations and, in a time-critical manner, provides the pilot with the most important accident-avoidance information in the form of operating instructions 3.

The flight control system according to the invention consists of a computer which runs parallel with the flight control and which, as a vigilant observer, monitors flight and system parameters. On the one hand, it is based on a highly complex knowledge gained from high-expenditure simulation analyses of individual airplane components, as well as from fault tree analyses. The implementation of this knowledge can be carried out advantageously with respect to cost and time by means of the fuzzy logic used in the flight control system.

On the other hand, the flight control system is also based on extremely trivial knowledge, for example, the fact that negative speed values in sensor data are not meaningful in the case of an airplane. In known flight control systems, such knowledge is not implemented as a logical protective function, although it has repeatedly been determined that such illogical values have been taken into account in the case of flight accidents—for example, in the A320 Warsaw, Laud Air, X-31 and Birgen Air accidents.

From such data, which are nonsensical per se, the flight control system according to the invention draws conclusions concerning failure combinations and suitable preventive measures and, in addition, can make decisions on that basis concerning the switching of flight modes.

The following are four selected possible examples of analyzed knowledge to be implemented concerning safety-critical flight conditions, with an indication of the type of information source and the assigned risk class.

Event E1: When the speed is between Mach 0.7 and Mach 0.9, the angle of attack is greater than 20 degrees and the altitude is below 10,000 feet, altitude must be increased, because there will otherwise be a loss of stability. Information source: Knowledge concerning flight limitations, Risk Class 1.

Event E2: Angle of attack larger than 35 degrees, or massive abrupt angle of attack changes, result in loss of airplane. The basis of the evaluations are flight-mechanical examinations of aircraft stability. Information source: Knowledge concerning flight control system, Risk Class 2.

Event E3: It is known from accident analyses of X-31 that an iced-up Pitot tube leads to serious faulty measurements of speed data of the flight control system which, in the case of high-performance aircraft, may result in a departure (loss of control). In this case, nonsensical conditions occur for the Pitot pressure values: For example, ps is greater than pt. Source of information: Knowledge from the air data system, Risk Class 1.

Event E4: At speeds of above 300 knots, the landing gear must be raised. Information source: Knowledge concerning running gear systems, Risk Class 2.

According to the invention, such different knowledge is traced and linked by means of the fuzzy logic in a fully integrating manner. When the fuzzy logic is used, the precise mathematical definition and modeling of such operations is not required, but such bases of knowledge can be taken over directly in the linguistic form without any loss of the required precision and significance of the monitoring of these data. This is an advantageous feature of the invention, because there are sufficient examples from complex technical systems in which exact modeling is not possible.

By use of individual rules, which comprise self-contained safety information with an individual consequence assignment for all potential warnings, the combination capability and flexible knowledge implementation of the rule base are ensured. The clarity and examinability of the knowledge structure can therefore be checked with respect to one rule after another.

When new knowledge is obtained, for example, from a flight test, it is possible that it will not appear to conform at all with the previous input and output data of the flight control system. It can nevertheless be implemented by means of a single new set in the linguistic format, while adding the now required input and output. This leaves the previously existing rule structure completely unaffected, while the flight control system has simply gained a recognition that is automatically integrated in the existing knowledge base, and is nevertheless taken into account in all cross connections. Only if the rule is addressed by means of its special combination of parameters, will it become active and make its contribution defined in its recognition to the overall picture of the airplane evaluation process.

When selecting the input quantities, the following considerations should be taken into account:

Which data provides the largest possible overview of the entire airplane?

How is the actual airplane state and system state represented most precisely?

How does one obtain an unfiltered and unfalsified status overview of a malfunction?

It should be considered whether monitoring positions can be used, for example, for the actual flapaileron positions or for the actual existing attitude or ground approach. However, since such systems themselves are still in the development stage, and currently their implementation is also limited with respect to the computer hardware, they have not been taken into account in the solution according to the invention. However, in the future, they can be integrated into the selected input quantity field.

The selected input quantities include all electronic signals/flight data which an airplane has available. These are subsystem data of:

Flight control system data of the FCCs
air data system sensors
warning system data of the avionics
landing gear
life support systems
cockpit interface
weapon system
flight test instruments
crash recorder
hydraulic system
fuel systems
propulsion (EJ200)
structure sensors (loads)

For use, according to the invention, of the above-mentioned knowledge bases concerning events E1 to E4, the following source flight data, for example, are used in the flight control system:

1. ps static pressure of the air data transducers (hPa)
2. pt total pressure of the air data transducers (hPa)
3. qc differential pressure of the air data transducers (hPa)
4. altitude amount of air data computer altitude measurement (feet)
5. KDAS calibrated flight speed of the air data computers (knots)
6. Mach flight speed of FCC measurements (Mach number)
7. AOA airplane angle of attack of FCC measurements (degrees)
8. LG landing gear parameters (0.0) raised/extended By using many different data inputs for a single control and warning system, a high degree of flexibility and analysis potential is achieved.

When using fuzzy logic, each rule of the flight control system according to the invention uses only the respective rule-specifically required data, without coming into conflict with data that are not required. This simplifies the structure of the flight control system, eliminating the need for high-expenditure detailed input definitions in the computer code.

The signal flow of the input data is evaluated by the fuzzy logic, one rule after another, irrespective of whether they are correct or faulty. Set for set, the rule base of the flight control system is divided into individual recognitions, which influence individual system recognitions and their operational consequences in an arbitrary sequence. These rules represent the system engineers' knowledge.

In this case, it is possible that one rule requires only one of the input signals or that another rule requires several of the signals in order to be able to draw correct conclusions as a result of cross comparisons.

The fuzzification of flight ranges represents an operation which can easily be carried out graphically and which, after the fuzzification has taken place, by means of the fuzzy interference system, is automatically transformed into computer code for the flight control system.

This transformation is implemented by establishing the recognitions in IF-THEN rules. In this case, the IF conditions must be defined by means of membership functions with respect to the respective input signal. As a result of AND and OR combinations, several parameters in one rule can also be connected, because in most cases of an operating instruction, a statement applies only when several combined conditions have been satisfied simultaneously. The THEN part of the rules contains the consequence assigned to the rule.

The consequence contains the corresponding priority of the selected operation for changing flight parameters or system status conditions, the definition of the operation itself, as well as the risk of the system and flight parameter combination.

The following is an example of a rule base data set according to the invention, which consists of 26 rules with the warning messages, the flight range definitions and the overall risk determinations:

1. If (mach is min) or (alt is altin) or (kdas is kin) or (aoa is aoain) or (landgear is lgin) or (qc is qcin) or (ps is psin) or (pt is ptin) then (risk is low) (aoawarn is low) (overspeedwarn is low) (lowspeedwarn is low) (revmodewarn is low) (lgretractwarn is low) (altwarn is low) (1)
2. If (mach is mst) or (kdas is kst) then (risk is med) (aoawarn is low) (overspeedwarn is low) (lowspeedwarn is med) (revmodewarn is low) (lgretractwarn is low) (altwarn is low) (1)
3. If (mach is mstm) or (kdas is kstm) then (risk is high) (aoawarn is low) (overspeedwarn is low) (lowspeedwarn is high) (revmodewarn is low) (lgretractwarn is low) (altwarn is low) (1)
4. If (mach is mspo) or (kdas is kspo) then (risk is med) (aoawarn is low) (overspeedwarn is med) (lowspeedwarn is low) (revmodewarn is low) (lgretractwarn is low) (altwarn is low) (1)
5. If (mach is smspom) or (kdas is kspom) then (risk is high) (aoawarn is low) (overspeedwarn is high) (lowspeedwarn is low) (revmodewarn is low) (lgretractwarn is low) (altwarn is low) (1)
6. If (mach is maoal) and (aoa is aoarl) then (risk is med) (aoawarn is med) (overspeedwarn is low) (lowspeedwarn is low) (revmodewarn is low) (lgretractwarn is low) (altwarn is low) (1)
7. If (mach is maoa2) and (aoa is aoar2) then (risk is med) (aoawarn is med) (overspeedwarn is low) (lowspeedwarn is low) (revmodewarn is low) (lgretractwarn is low) (altwarn is low) (1)
8. If (mach is maoa3) and (aoa is aoar3) then (risk is med) (aoawarn is med) (overspeedwarn is low) (lowspeedwarn is low) (revmodewarn is low) (lgretractwarn is low) (altwarn is low) (1)
9. If (aoa is aoar4) then (risk is med) (aoawarn is med) (overspeedwarn is low) (lowspeedwarn is low) (revmodewarn is low) (lgretractwarn is low) (altwarn is low) (1)
10. If (aoa is aoaepm) then (risk is high) (aoawarn is high) (overspeedwarn is low) (lowspeedwarn is low) (revmodewarn is low) (lgretractwarn is low) (altwarn is low) (1)
11. If (aoa is aoaenm) then (risk is high) (aoawarn is high) (overspeedwarn is low) (lowspeedwarn is low) (revmodewarn is low) (lgretractwarn is low) (altwarn is low) (1)
12. If (mach is mlgs) and (alt is altlg) and (kdas is klg) and (landgear is lgout) then (risk is med) (aoawarn is low) (overspeedwarn is low) (lowspeedwarn is low) (revmodewarn is low) (lgretractwarn is med) (altwarn is low) (1)
13. If (mach is mlgsm) and (alt is altlgm) and (kdas is klgm) and (landgear is lgout) then (risk is high) (aoawarn is low) (overspeedwarn is low) (lowspeedwarn is low) (revmodewarn is low) (lgretractwarn is shigh) (altwarn is low) (1)
14. If (qc is qcneg) then (risk is med) (aoawarn is low) (overspeedwarn is low) (lowspeedwarn is low) (revmodewarn is med) (lgretractwarn is low) (altwarn is low) (1)
15. If (qc is qcnegm) then (risk is high) (aoawarn is low) (overspeedwarn is low) (lowspeedwarn is low) (revmodewarn is high) (lgretractwarn is low) (altwarn is low) (1)
16. If (alt is altptlow) and (ps is pslow) then (risk is high) (aoawarn is low) (overspeedwarn is low) (lowspeedwarn is low) (revmodewarn is high) (lgretractwarn is low) (altwarn is low) (1)
17. If (alt is altpshigh) and (ps is pshigh) then (risk is high) (aoawarn is low) (overspeedwarn is low) (lowspeedwarn is low) (revmodewarn is high) (lgretractwarn is low) (altwarn is low) (1)
18. If (mach is mlow) and (alt is altptlow) and (pt is pthigh) then (risk is high) (aoawarn is low) (overspeedwarn is low) (lowspeedwarn is low) (revmodewarn is shigh) (lgretractwarn is low) (altwarn is low) (1)
19. If (mach is mhigh) and (alt is altptlow) and (pt is ptlow) then (risk is high) (aoawarn is low) (overspeedwarn is low) (lowspeedwarn is low) (revmodewarn is high) (lgretractwarn is low) (altwarn is low) (1)
20. If (alt is altlow) then (risk is med) (aoawarn is low) (overspeedwarn is low) (lowspeedwarn is low) (revmodewarn is low) (lgretractwarn is low) (altwarn is med) (1)
21. If (alt is altlowmax) then (risk is high) (aoawarn is low) (overspeedwarn is low) (lowspeedwarn is low) (revmodewarn is low) (lgretractwarn is low) (altwarn is high) (1)
22. If (alt is althigh) then (risk is med) (aoawarn is low) (overspeedwarn is low) (lowspeedwarn is low) (revmodewarn is low) (lgretractwarn is low) (altwarn is med) (1)
23. If (alt is althighmax) then (risk is high) (aoawarn is low) (overspeedwarn is low) (lowspeedwarn is low) (revmodewarn is low) (lgretractwarn is low) (altwarn is high) (1)

24. If (mach is msr2) and (alt is altsr2) and (aoa is aoasr2) then (risk is med) (aoawarn is med) (overspeedwarn is low) (lowspeedwarn is low) (revmodewarn is low) (lgretractwarn is low) (altwarn is med) (1)

25. If (mach is mlos) and (alt is altlow) and (kdas is klos) and (aoa is aoalos) then (risk is med) (aoawarn is med) (overspeedwarn is low) (lowspeedwarn is low) (revmodewarn is low) (lgretractwarn is low) (altwarn is med) (1)

26. If (mach is mads) and (alt is altads) then (risk is high) (aoawarn is low) (overspeedwarn is high) (lowspeedwarn is low) (revmodewarn is med) (lgretractwarn is low) (altwarn is med) (1)

Figure 2:
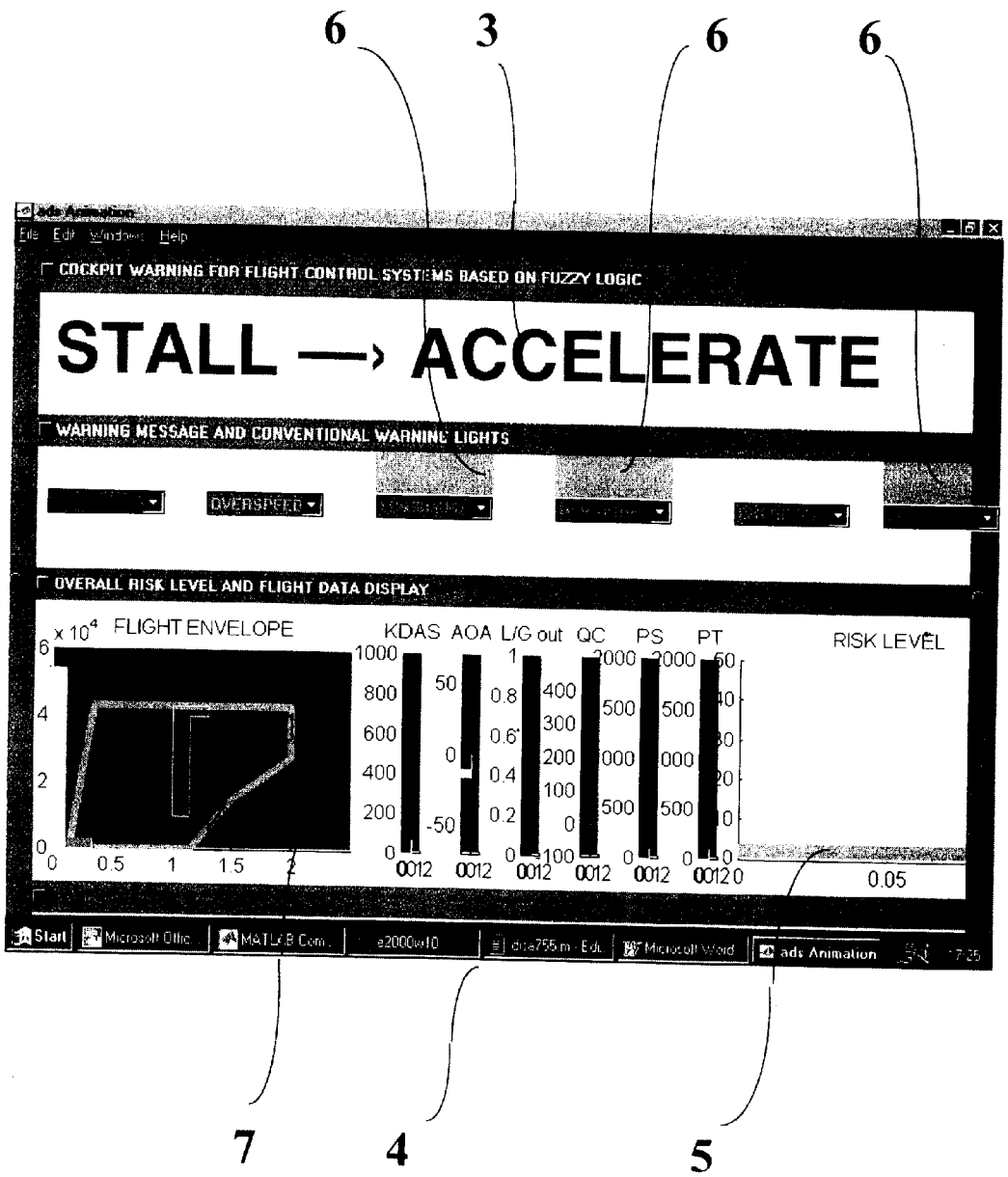
FIG. 2 is a view of the display of the flight control system according to the invention.

FIG. 2 shows the display 4 of the flight control system, which is constructed as a multi function head down display (MHHD). The basic output quantity of the flight control system shown in the display is the overall risk level 5 which is follows online during the flight.

Since the statement concerning the overall risk alone does not represent sufficient accident protection, the overall risk is constructed of all danger potentials of the individual rules. The individual risks which apply to the actual flight situation control warning lights 6 assigned to them and, combined with the overall risk level, control corresponding warning and operating instructions 3. The latter are also being displayed on a head up display—not taken into account in FIG. 2—in the cockpit. The airplane position is shown in a flight envelope 7 indicated in the display.

For the example of the above-indicated knowledge base with the events E1 to E4, the following functions of the output quantities are implemented:

Overall risk level—varying size of a red bar;
warning lights—red warning lights increasing to the complete value which, when the threshold value is exceeded, remain set on red.

The internal distribution of the warning lights is implemented as follows:

1. Altitude warning
2. AOA warning
3. stall warning
4. overspeed warning
5. REVERSIONARY MODE warning
6. landing gear warning Each warning light control comprises the knowledge of the individual dimension of the risk potential of the specific warning for the momentary flight and system condition. Thus, the size of the red warning bar can be continuously adapted to the risk and to the operating priority in real time. This function for risks in the range of from 0 to $\leq 1$ is useful for the timely recognition of the approach to a critical condition. The numerical value is taken into account as an evaluation basis of the automatic TOP operating instruction. Also in the case of the used fuzzy system, the information content of several simultaneous warnings is not withheld from the pilot. If required, the pilot receives a precise indication of the individual warnings and their risk potential in the form of increasing and decreasing red bars. However, this function is optional in order not to inundate the pilot with information.

Starting at a defined risk value (risk$\geq 1$) of an individual warning, the individual warning light remains constantly set on red as long as there is no falling below the risk value. In contrast, the TOP operating instruction is based on the relative continuous weighing of the priorities of the individual warning lights, and takes over the automatic selection and display of the most important singular operating instruction.

In the following, the processing for establishing the warnings and for selecting the top level operating instructions will be described in detail. The input data are read in and are used as input for the fuzzy sets of the input variables. The rules respond only to an individually applicable parameter constellation. The fulfillment degree $\mu_{is}$ is represents the extent of the applicability of the condition portion of the rule. Each individual control knowledge potentially has access to all available warnings. The

| warnings per rule | $W_{ij} = \mu_{is} \cdot c_{ij}$ |
| and risk per rule | $Risk_i = \sum_{j=1,2,\ldots,n} W_{if}$ | are directly dependent on the fulfillment degree $\mu_{is}$ and the constants $c_{ij}$. The constants reflect the danger potential, the applicability of the parameter combination as well as the priority of the individual warnings of the individual rule. The rule describes the critical condition, and the warnings/operating instructions represent the solution of the problem. However, the real flight data parameter combination is also simultaneously considered by additional rules, and their knowledge base. These knowledge carriers evaluate the flight condition under their individual aspects with their individual action consequences. Generally, the fulfillment degrees of the various rules differ in the case of one and the same flight condition.

The superset overall picture of the airplane condition is obtained from the integrated evaluation of all individual consequences. An individual warning A comprises the entire knowledge of all rules concerning the applicability of the warning A. In this case, an actual extent of the applicability of the warning A is determined in a continuous and stepless manner.

$$\text{For } Warn_j = \sum_{j=1,2\ldots,n} W_{if} \text{(with } j = A, \text{ and } i = \text{number of rules)},$$

this means an adding of all rule-related warning fractions for warning A. The warning fractions $W_{ij}=\mu_{is}$, $c_{ij}$ vary in a continuous manner. For example, in the case of the actual flight data parameter combination, a Rule 2 receives a warning fraction of 0.3 for warning A because it is only 30%=$\mu_{is}$ (is=2) fulfilled ($W_{ij}=\mu_{is}\cdot c_{ij}=30\%$, 1=0.3) and even in the case of a 100% fulfillment, it can maximally only achieve the warning A value of 1=$c_{ij}$. In contrast, Rule 3 can obtain a maximal warning value 10=$c_{ij}$ with (is=3) for warning A which corresponds to the risk analysis. In the case of a 100% fulfillment=$\mu_{is}$ of this rule (that is, flight data parameter combination completely fulfills Rule 3), the warning value 10 is generated for warning A.

As a result of the integration of all individual warnings $$Warn_j = \sum_{j=1,2\ldots,n} W_{ij}$$

the total warning value of Rule 2 and Rule 3 is now obtained corresponding to 10+0.3=10.3 for warning A.

However, whether warning A also represents the most important head up display warning for the actual flight condition can be determined only by the comparison with all other warnings B, C . . . N determined analogous to warning A.

The determination of the top warning HUDWarn=Max$_{j=A, B, \ldots N}$ (Warn$_j$) takes place by way of a cross comparison of all added individual warning values. In addition, an absolute overall risk value $$\text{overall } risk_i = \sum_{is=1,2\ldots,n} Risk_i = \sum_{j=A,B,\ldots,N} Warn_i$$

must also be exceeded in order to ensure that only warnings which satisfy defined minimal criticality are set. This overall risk value must prevent faulty warnings, but also has the function of adding-up individual warnings below the risk threshold to identify a possibly still critical condition.

The constants $c_{ij}$ of the warning fields $w_{ij} = \mu_{is} \cdot c_{ij}$ are assigned to the individual risk potentials of the parameter combination. The maximum warning field constants reachable by ($\mu_{is}=1$) represent the maximum hazard risk index assigned to the situation. The hazard risk index assigned to an individual rule is simultaneously also assigned to the value of the individual warning of this rule, as well.

However, for the user or programmer of this warning logic in the daily operation, this entire transaction is represented on a superset plane. In linguistic sets, a description of a critical parameter combination must be fed and the action consequence must be defined. The constants are obtained from the actual safety analyses. As a result, the new individual information is integrated into the controller of the flight system, and is automatically integrated in the existing knowledge base.

For determining the accumulation of risks, the Sugeno summation method of the rule consequences of the individual rules is used. Continuously from 0 to the maximum value (1→MEDIUM+10→HIGH)=11, each rule can receive warnings and risks in its consequence. Each rule output for a specific operating instruction is added to the overall priority of the specific operating instruction.

As an alternative, the center-of-gravity method can also be used for this purpose. This method represents a standardization of the added-up consequence values but cannot carry out the function of required risk additions. However, it is also suitable for setting priorities.

Figure 3:
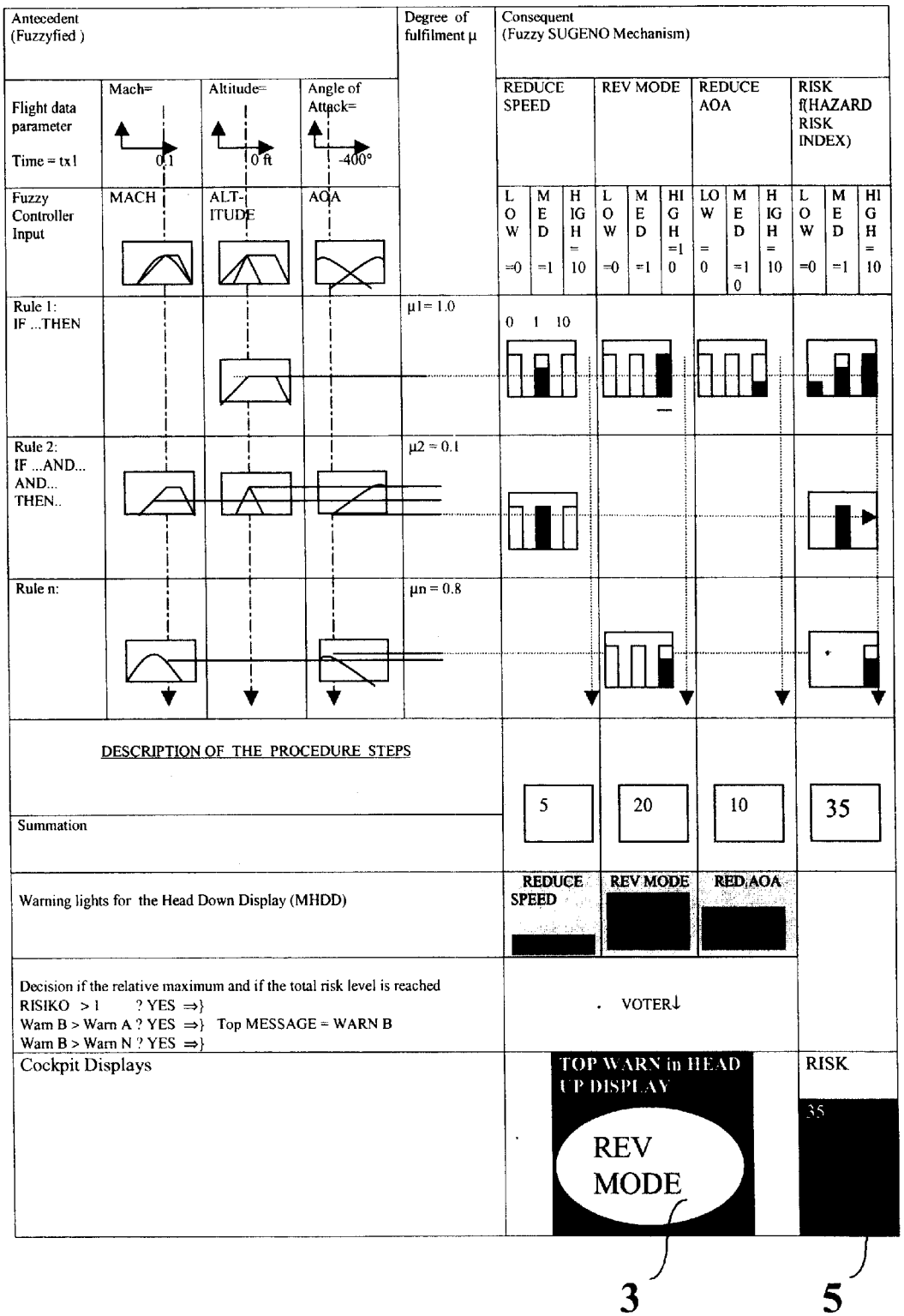
FIG. 3 shows an example for generating a top level warning in the flight control system according to the invention.

The example illustrated in FIG. 3 for generating a top level warning shows how, by means of the fuzzy SUGENO mechanism, the overall risk level 5 and the operating instruction 3—"REV MODE"—is determined from determined individual risks. The input data used in this case are the flight data parameters Mach, altitude and angle of attack.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A computer-based onboard aircraft flight information system which automatically and continuously evaluates flight data parameters determined on board, and displays information to the pilot determined from the evaluation, said flight information system comprising a computer which runs parallel to a flight control computer of the aircraft, wherein:

the computer which runs in parallel uses fuzzy logic to carry out risk evaluations with respect to actual aircraft flight conditions using knowledge bases implemented in the flight information system;

the results of the risk evaluations are displayed in the cockpit;

the flight information system determines individual risks relevant to the flight conditions and determines an overall risk therefrom; and the overall risk is continuously indicated on the display as a luminous bar.

2. The flight information system according to claim 1, wherein with respect to a determined overall risk, in the event of danger, the flight control system automatically generates an operating instruction for the pilot, whose implementation can eliminate the dangerous flight condition.

3. The flight information system according to claim 2, wherein the operating instruction is also supplied additionally to a head up display.

4. The flight information system according to claim 3, wherein the overall risk is determined according to Sugeno summation methodology.

5. The flight information system according to claim 2, wherein the overall risk is determined according to Sugeno summation methodology.

6. The flight information system according to claim 1, wherein the overall risk is determined according to Sugeno summation methodology.

7. An aircraft flight information and warning system, comprising:

for an aircraft having a computer-based flight control system that includes a first flight control computer;

a second computer which runs in parallel to the first computer and shares information generated and received by the first computer;

fuzzy logic means implemented in said second computer, for performing risk evaluations with respect to actual aircraft flight conditions using knowledge bases implemented in the flight control system;

a display unit connected to display results of risk evaluations performed by said second computer;

the flight information system determines individual risks relevant to the flight conditions and determines an overall risk therefrom; and the overall risk is continuously indicated on the display as a luminous bar.

8. The flight information system according to claim 7, wherein with respect to a determined overall risk, in the event of danger, the flight control system automatically generates an operating instruction for the pilot, whose implementation can eliminate the dangerous flight condition.

9. The flight information system according to claim 7, wherein the operating instruction is also supplied additionally to a head up display.

10. The flight information system according to claim 7, wherein the overall risk is determined according to Sugeno summation methodology.

* * * * *